Sept. 22, 1942.  D. ROBERTS  2,296,305

MANUFACTURE OF THIN SHEETS OF CHEMICALLY BLOWN RUBBER

Filed Dec. 1, 1939

INVENTOR
Dudley Roberts
BY
Osterlenk & Grune
ATTORNEY

Patented Sept. 22, 1942

2,296,305

UNITED STATES PATENT OFFICE 2,296,305

MANUFACTURE OF THIN SHEETS OF CHEMICALLY BLOWN RUBBER

Dudley Roberts, New York, N. Y., assignor to Rubatex Products, Inc., New York, N. Y., a corporation of Delaware Application December 1, 1939, Serial No. 307,062

3 Claims. (Cl. 18—53)

My invention relates to a novel method for making thin sheets of closed cell gas expanded rubber by the chemical blow method, and, more particularly, my invention relates to a method for making thin sheets of chemically blown closed cell gas expanded rubber by gassing a sheet of rubber while confining it against substantial expansion, partially curing such gassed and partially expanded rubber, then slitting said rubber to provide a plurality of thin sheets and finally curing and expanding said thin split sheets in suitable molds.

In the manufacture of closed cell gas expanded rubber by the method in which gas is externally injected under pressure into the rubber in an autoclave there is no particular difficulty in the manufacture of thin sheets of closed cell rubber. This is because the rubber is held against expansion by the counterpressure of the gas surrounding it. This counterpressure of gas prevents any of the gas injected in the rubber from leaking out.

However, when closed cell rubber sheets are made by the chemical blow process in which such sheets containing a chemical blowing agent are confined against expansion in a press while the gas is evolved in the rubber to form a closed cell structure, then there is a tendency for the gas to leak out because such presses or platens of presses are not gas tight.

This is particularly so when thin sheets are made. The process of making such thin sheets by a chemical blow method consists in intermixing the chemical blowing agent with the rubber, forming the rubber into sheets and confining the sheets in a press while heating it to decompose the chemical blowing agent and cause the evolution of gas while precuring the rubber.

Unlike the gassing chamber process in which the rubber is completely surrounded by a counter pressure of gas, in the chemical blow process, the rubber is confined mechanically in a mold and there is a great tendency for the gas evolved to leak out from the rubber. This, in thin sheets, causes collapse in whole or in part, and a very poor structure of the cells.

I have now devised a novel method by means of which I may form thin sheets of chemically blown rubber and my process makes possible a more rapid production of thin sheets as well as the formation of a homogeneously gassed uniform sheet.

It is the object of my invention, therefore, to provide a novel method for making thin closed cell gas expanded rubber sheets.

It is another object of my invention to provide a novel method for making thin sheets of closed cell rubber formed by the chemical blow process.

It is a further object of my invention to provide a novel method of making thin sheets of closed cell gas expanded rubber in which the cells of the rubber contain the residue of a chemical blowing agent.

It is still a further object of my invention to provide a novel method of splitting closed cell gas expanded rubber.

Further objects of my invention will be apparent from the specific description which here follows:

I form my mix by compounding with rubber on a mill the desired vulcanizing, accelerating and compounding ingredients according to the following formula:

| | Parts by weight |
|---|---|
| Rubber | 100 |
| Sulphur | 3 to 10 |
| Light calcined magnesia | 6 |
| Gilsonite | 25 |
| Diphenyl guanidine | 2 |
| Low melting bituminous substance (asphalt) | 25 |

I then thoroughly mix with the above compound a chemical blowing agent adapted to decompose under heat and evolve a suitable gas. I prefer to employ a chemical blowing agent which will release nitrogen gas, since nitrogen gas is substantially insoluble in the rubber and will not diffuse out from the rubber. In as much as I am making in the above a soft closed cell gas expanded rubber, the rubber structure is supported primarily by the closed gas cells and hence it is necessary that an insoluble gas be employed. A suitable blowing agent is a mix of ammonium chloride and sodium nitrite, although other nitrites and ammonium salts may be employed.

Figure 1:
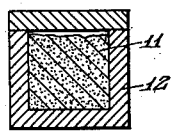
Figure 1 is a schematic illustration of a mold containing the rubber to be gassed.
Figure 2:
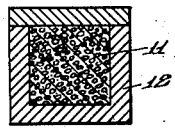
Figure 2 illustrates the partly vulcanized and gassed rubber.
Figure 3:
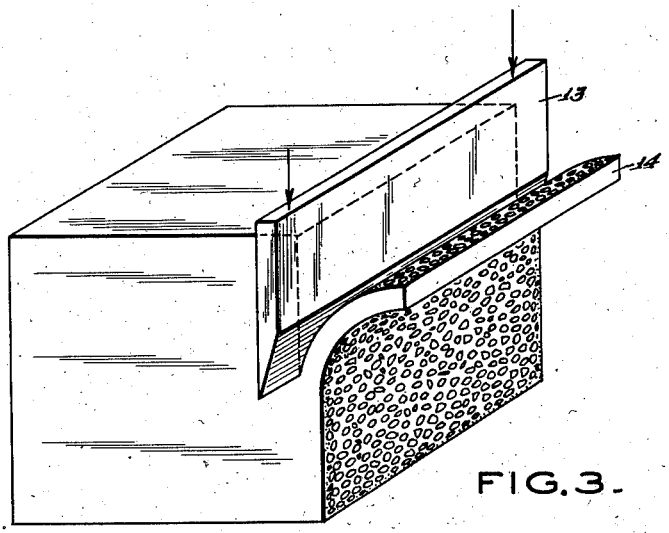
Figure 3 illustrates the partly vulcanized rubber being cut.
Figure 4:
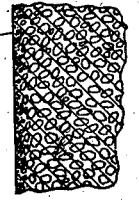
Figure 4 is a partial view of the completely vulcanized sliced rubber with the skin formation.
Figure 5:
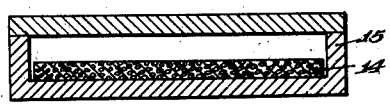
Figure 5 illustrates the sliced rubber in the mold for its final vulcanization.

After being thoroughly intermixed with its respective components and with the chemical blowing agent, the rubber stock 11 is then shaped to the desired size and confined in a mold 12 so that it substantially fills the mold. The mold is then heated by some suitable heating means, which heating means causes both a partial vulcanization of the rubber and also the decomposition of the included chemical blowing agent so that gas is evolved. The evolution of the gas in the chemical blow agent causes the expansion of the rubber, but since the rubber is confined by the mold as shown in Figure 2 against material expansion and a partial cure has been imparted to the rubber to give it a greater tensile strength, closed cell rubber is formed.

I then release the rubber from its confinement in the mold whereupon a certain expansion takes place. This expansion may be as high as 80% of the final or complete expansion. The rubber is now partially cured and partially expanded and it is ready for the final heating, vulcanizing and expanding operation.

Figure 6:
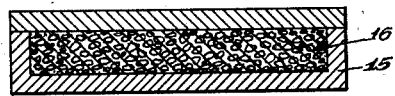
Figure 6 illustrates the finished gas expanded sliced cell tight rubber.

Prior to this final operation I slit the rubber to any desired thinness with some suitable cutting means 13, suitable for forming thin sheets 14 and place the split sheets of rubber in their respective molds 15 and apply heat which again expands the rubber to its final size and shape as at 16 Figure 6 and also imparts a final cure to the rubber.

Thin sheets of rubber a half inch thick and less have been formed with perfect cellular structure by this method. It is within the scope of my invention to split the partially cured and expanded rubber into as many and as thin sheets as is found desirable.

After the final expansion and cure the thin sheets of rubber have a suitable vulcanized skin 17 and, as pointed out above, have the desirable homogeneous and complete closed cell gas expanded structure.

Although I have pointed out that the process here disclosed is of value in obtaining proper closed cell structure, it is also of importance that I can produce a multiplicity of sheets from a single sheet of partially expanded rubber. Thus, from an initial thickness of one-half inch of rubber, after partial expansion, this original half inch thickness of rubber may be split into about six individual sheets. It will be recognized that it would be extremely difficult to make very thin sheets, say on the order of one-eighth of an inch thickness since such a sheet would require an original sheet of one-thirty-second of an inch thickness. However, by the process I above set forth, I can form necessary thin sheetings of chemically blown closed cell gas expanded rubber in a rapid and efficient manner.

It is to be understood that I can form sheets of either hard or soft closed cell gas expanded rubber. The degree of hardness or softness depends upon the amount of sulphur combined with the rubber. The sulphur content may range from 3 to 50 per cent.

It is also within the contemplation of my invention to use any chemical blowing agent found desirable. Thus, although I have set forth a particular chemical blowing agent, I may employ any compound or compounds which are adapted to decompose or react to evolve a suitable gas. Although nitrogen gas is preferred as a blowing agent in the manufacture of soft closed cell rubber, I may employ carbon dioxide or other gases when hard closed cell rubber is to be made.

I should like to stress the fact that my method is particularly useful for the manufacture of light weight material. I obtain light weight material because only a thin skin is formed on the plane surface of the sheets of rubber according to my process. In the ordinary methods of this art, in the formation of sheeting a relatively thick skin is formed on the surface of the sheet and this skin is begun during the step of partial vulcanization and is gradually built up during the final vulcanization. This relatively thick crust of skin is a material portion of the weight of the article, particularly when low weight hard board, on the order of four pounds per cubic foot is formed. In extremely light weight of this kind, the heavy skin is a material factor.

Another factor in the formation of the thick skin is that the skin is formed by the crushing of the outer layers of cells. For example, in the first stage of the formation of the closed cell rubber sheet, either by the gasing chamber or the chemical blow process, the sheet expands against the mold under considerable force, which expansion crushes the outer layers of the cells, compressing them and vulcanizing them to form the skin. This skin is added to by the second stage of expansion and final vulcanization. The skin, in other words, consists in a vulcanized layer of crushed cells of rubber.

According to my novel method herein before set forth, after the rubber is gassed and partially vulcanized, it is permitted to expand substantially. Often this expansion, as pointed out above, may be as high as eighty per cent of the final or complete expansion. Thereafter I slit the rubber into the form of thin sheets. These thin sheets are then finally cured in a suitable mold or platen whereupon they expand the final twenty per cent or more and a thin skin is formed thereon.

Thus the sheets or thin sheets of closed cell gas expanded rubber formed according to my process have an unusually thin skin since it is made up not through the course of one hundred per cent expansion and two stages of vulcanization but only through approximately twenty per cent expansion and a single stage of cure. This thin skin rubber is particularly useful when a light material is desired in which surface resistance to impact is not material.

Although I have spoken particularly of my invention with respect to the manufacture of thin sheets of chemically blown closed cell rubber, it is within the purview of my invention to manufacture other thin objects of different shapes and further my invention is applicable in forming objects of any size in which an unusually thin skin is desired. This is accomplished by cutting the gassed, partially cured and partially expanded closed cell gas expanded chemically blown rubber before the final expansion and cure.

I claim:

1. The method of making thin sheets of the order of one-eighth of an inch of closed cell gas expanded rubber which comprises incorporating a chemical blowing agent in rubber, heating the rubber to partially cure and partially expand said rubber, slicing said rubber into sheets, placing said thin sheets in a mold, and heating said sheets to expand and finally cure said sheets.

2. The method of making sheets of closed cell gas expanded rubber which comprises incorporating a chemical blowing agent in rubber, confining the rubber against substantial expansion, heating the rubber to partially cure and partially expand said rubber, releasing said partially cured and partially expanded rubber from confinement, slicing said rubber into sheets, heating said sheets to expand and finally cure said sheets to thicknesses of the order of one-eighth of an inch.

3. The method of making thin sheets of closed cell gas expanded rubber which comprises incorporating a chemical blowing agent in rubber, confining the rubber against substantial expansion in a mold, heating the rubber to partially cure and partially expand said rubber, releasing said partially cured and partially expanded rubber from confinement, slicing said rubber into thin sheets, placing said thin sheets in a mold, and heating said thin sheets to expand and finally cure said sheets to thicknesses of the order of one-eighth of an inch.

DUDLEY ROBERTS.